(12) United States Patent
Fehr et al.

(10) Patent No.: US 10,195,621 B2
(45) Date of Patent: Feb. 5, 2019

(54) PUMP CHANGEOVER ALGORITHM FOR SPRAY SYSTEM

(71) Applicant: Graco Minnesota Inc., Minneapolis, MN (US)

(72) Inventors: David L. Fehr, Champlin, MN (US); John R. Ingebrand, New Prague, MN (US); Jeffrey U. Shaffer, Minneapolis, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 14/905,192

(22) PCT Filed: Jul. 18, 2014

(86) PCT No.: PCT/US2014/047209
§ 371 (c)(1),
(2) Date: Jan. 14, 2016

(87) PCT Pub. No.: WO2015/010029
PCT Pub. Date: Jan. 22, 2015

(65) Prior Publication Data
US 2016/0158784 A1    Jun. 9, 2016

Related U.S. Application Data

(60) Provisional application No. 61/856,104, filed on Jul. 19, 2013.

(51) Int. Cl.
*B05B 7/04* (2006.01)
*B05B 7/24* (2006.01)
(Continued)

(52) U.S. Cl.
CPC .............. *B05B 7/1254* (2013.01); *B05B 7/04* (2013.01); *B05B 7/24* (2013.01); *B05B 9/0406* (2013.01);
(Continued)

(58) Field of Classification Search
CPC ........... B05B 7/1254; B05B 7/04; B05B 7/24; B05B 9/0406; B05B 9/0413
(Continued)

(56) References Cited

U.S. PATENT DOCUMENTS 3,889,850 A * 6/1975 Whitt .................... B05B 7/1409
222/135
3,908,862 A * 9/1975 Chandra ............... B29B 7/7626
222/134

(Continued)

FOREIGN PATENT DOCUMENTS

JP     S63111962 A     5/1988
JP     2010227855 A    10/2010
(Continued)

OTHER PUBLICATIONS

Extended European Search Report for EP Application No. 14825608.4, dated Jan. 23, 2017, 10 Pages.
(Continued)

*Primary Examiner* — Chee-Chong Lee
(74) *Attorney, Agent, or Firm* — Kinney & Lange, P.A.

(57) ABSTRACT

A method of actuating a double-action pump assembly with a reciprocating plunger includes signaling the reciprocating plunger to stop for a changeover period; while the pump is stopping, signaling the first inlet and outlet valves to close; while the first inlet and outlet valves are closing, signaling the second inlet and outlet valves to open, such that the second inlet and outlet valves begin to mechanically open at least a dwell period after the first inlet and outlet valves have (Continued)

Figure 1:
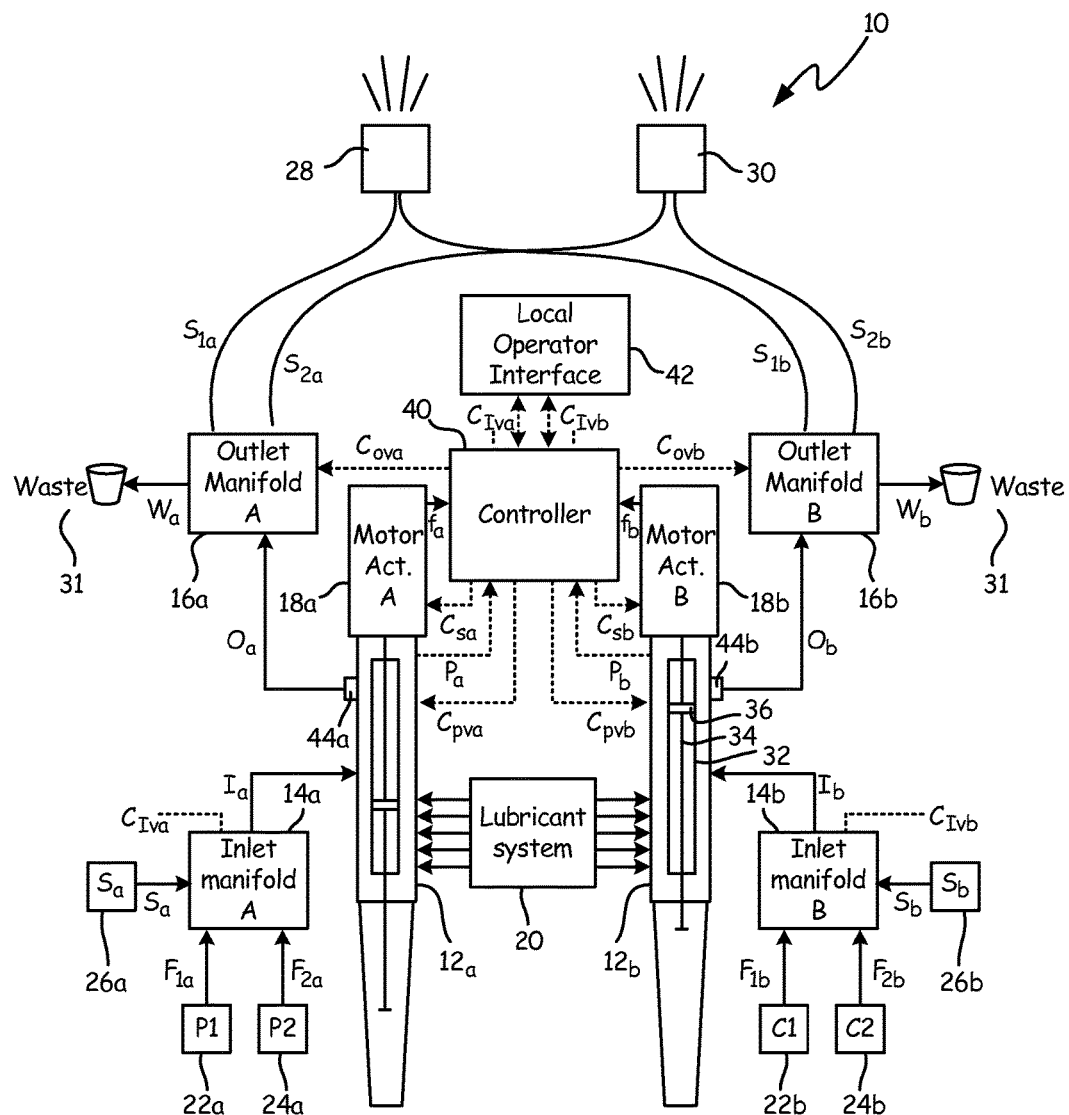

entirely closed; and signaling the reciprocating plunger to begin moving while the second inlet and outlet valves are closing.

4 Claims, 4 Drawing Sheets

(51) Int. Cl.

| | |
|---|---|
| *B05B 7/12* | (2006.01) |
| *B05B 15/55* | (2018.01) |
| *B05B 12/08* | (2006.01) |
| *B05B 12/14* | (2006.01) |
| *F04B 5/02* | (2006.01) |
| *F04B 7/02* | (2006.01) |
| *F04B 13/00* | (2006.01) |
| *F04B 15/02* | (2006.01) |
| *F04B 17/03* | (2006.01) |
| *F04B 19/22* | (2006.01) |
| *F04B 23/06* | (2006.01) |
| *F04B 39/02* | (2006.01) |
| *F04B 39/10* | (2006.01) |
| *F04B 49/10* | (2006.01) |
| *F04B 49/22* | (2006.01) |
| *F04B 51/00* | (2006.01) |
| *F04B 53/10* | (2006.01) |
| *F04B 53/14* | (2006.01) |
| *F04B 53/16* | (2006.01) |
| *F16N 7/32* | (2006.01) |
| *B29B 7/74* | (2006.01) |
| *B05B 9/04* | (2006.01) |

(52) U.S. Cl.
CPC .......... *B05B 9/0413* (2013.01); *B05B 12/087* (2013.01); *B05B 12/149* (2013.01); *B05B 12/1418* (2013.01); *B05B 15/55* (2018.02); *B29B 7/7447* (2013.01); *F04B 5/02* (2013.01); *F04B 7/02* (2013.01); *F04B 13/00* (2013.01); *F04B 15/02* (2013.01); *F04B 17/03* (2013.01); *F04B 19/22* (2013.01); *F04B 23/06* (2013.01); *F04B 39/0292* (2013.01); *F04B 39/10* (2013.01); *F04B 49/10* (2013.01); *F04B 49/22* (2013.01); *F04B 51/00* (2013.01); *F04B 53/10* (2013.01); *F04B 53/14* (2013.01); *F04B 53/16* (2013.01); *F16N 7/32* (2013.01); *B05B 7/0408* (2013.01); *B05B 7/2486* (2013.01); *B05B 7/2497* (2013.01); *B05B 9/04* (2013.01); *F04B 2201/0601* (2013.01)

(58) Field of Classification Search
USPC .............................................................. 239/1
See application file for complete search history.

(56) References Cited

U.S. PATENT DOCUMENTS

| | | | | |
|---|---|---|---|---|
| 4,030,860 | A * | 6/1977 | Standlick | F04B 7/0266 |
| | | | | 417/343 |
| 4,090,695 | A * | 5/1978 | Stone | B29B 7/7626 |
| | | | | 222/63 |
| 4,228,924 | A * | 10/1980 | Gilbert | B01F 15/0237 |
| | | | | 137/99 |
| 4,269,327 | A * | 5/1981 | Welch | G01F 11/023 |
| | | | | 222/135 |
| 4,286,732 | A * | 9/1981 | James | B01F 15/0462 |
| | | | | 222/135 |
| 4,394,870 | A * | 7/1983 | MacPhee | B01F 15/0458 |
| | | | | 137/99 |
| 4,494,676 | A | 1/1985 | Berweger | |
| 6,561,767 | B2 * | 5/2003 | Berger | 417/279 |
| 6,840,404 | B1 | 1/2005 | Schultz et al. | |
| 2002/0029740 | A1 | 3/2002 | McLoughlin et al. | |
| 2004/0151594 | A1 | 8/2004 | Allington et al. | |
| 2005/0236498 | A1 | 10/2005 | Cunningham | |
| 2007/0104586 | A1 | 5/2007 | Cedrone et al. | |
| 2009/0084865 | A1 | 4/2009 | Maharajh | |
| 2010/0243101 | A1 | 9/2010 | Matsumoto | |

FOREIGN PATENT DOCUMENTS

| | | |
|---|---|---|
| WO | WO2013065478 A1 | 5/2013 |
| WO | WO2013094759 A1 | 4/2015 |
| WO | WO2013099797 A1 | 5/2015 |

OTHER PUBLICATIONS

International Search Report and Written Opinion from PCT Application Serial No. PCT/US2014/047209, dated Nov. 6, 2014, 11 pages.
Office Action from Taiwan Patent Application No. 103125016, dated Mar. 23, 2018, 18 pages.
Office Action from Japanese Patent Application No. 2016-527131, dated May 23, 2018, 7 pages.

* cited by examiner

PUMP CHANGEOVER ALGORITHM FOR SPRAY SYSTEM

BACKGROUND

The present invention relates generally to applicator systems that are used to spray fluids, such as paint, sealants, coatings, and the like. More particularly, the invention relates to a pump changeover algorithm to reduce changeover downtime in a spray system.

Fluid spray systems are used in a wide range of applications, including painting, glue application, and foam spraying. Some fluid applicators have separate "A-side" and "B-side" fluid systems (e.g. pumps, reservoirs, and fluid lines) that carry different fluids components, while others pump and spray only a single spray material. Common materials pumped in spray systems include paints, polyurethanes, isocyanates, polyesters, epoxies, and acrylics.

Many fluid applicator spray systems use gear pumps to provide adequate spray pressure. Some such systems instead use reciprocating pumps, but reciprocating pumps can produce fluctuations in pumping pressure at changeover due to halts in pumping while valves are opened or closed to switch pump states.

SUMMARY

In a second embodiment, a method of actuating a double-action pump assembly with a reciprocating plunger includes signaling the reciprocating plunger to stop for a changeover period; while the pump is stopping, signaling the first inlet and outlet valves to close; while the first inlet and outlet valves are closing, signaling the second inlet and outlet valves to open, such that the second inlet and outlet valves begin to mechanically open at least a dwell period after the first inlet and outlet valves have entirely closed; and signaling the reciprocating plunger to begin moving while the second inlet and outlet valves are closing opening.

In a second embodiment, a method of actuating a double-action pump assembly with a reciprocating plunger includes signaling the reciprocating plunger to stop for a changeover period; while the pump is stopping, signaling the first inlet and outlet valves to close; while the first inlet and outlet valves are closing, signaling the second inlet and outlet valves to open, such that the second inlet and outlet valves begin to mechanically open at least a dwell period after the first inlet and outlet valves have entirely closed; and signaling the reciprocating plunger to begin moving while the second inlet and outlet valves are closing.

BRIEF DESCRIPTION OF THE DRAWINGS

FIG. 1 is a schematic diagram of a spray system

FIGS. 2*a* and 2*b* are schematic views of operating states of a pump of the spray system of FIG. 1.

FIG. 3 is a method flowchart illustrating a method of controlling changeover of the pump of FIGS. 2*a* and 2*b*.

FIG. 4 is an illustrative graph of pump pressure and valve state as a function of time, according to the method of FIG. 3.

DETAILED DESCRIPTION

The present invention is a system and method for timing valve actuation during changeover of a reciprocating positive displacement pump of a spray system. Timing valve actuation to overlap dwell times from valve actuation reduces overall downtime during pump changeover, and accordingly reduces undesirable pressure fluctuation.

FIG. 1 is a schematic diagram of spray system 10, a two-side spray system with an A-side and a B-side configured to carry separate fluid components that are only combined when sprayed. Spray system 10 can, for example, combine an A-side paint with a B-side catalyst (e.g. a polyurethane, acrylic, polyester, or epoxy) at the moment of spraying. Although spray system 10 will be discussed hereinafter primarily as a system for spraying paint, the present invention can analogously be applied to sprayers for foam, adhesive, and other materials. Many components of spray system 10 are present in parallel on both A- and B-sides of the system. For clarity, A-side components are labeled with an "a" subscript, while B-side components are labeled with a "b" subscript. Hereinafter, reference numbers without subscript will be used to refer generically to elements found in parallel on both A- and B-sides of spray system 10, and to single elements common to both sides, while particular A- or B-side counterparts will be denoted with "a" or "b" subscripts, as appropriate. "Pump 12*a*" and "pump 12*b*," for example, are specific elements of the A- and B-side subsystems of spray system, respectively. Description related to "pump 12" (without subscript) refers generically to pump.

Spray system 10 includes A- and B-side pumps 12 that pump fluid from inlet manifolds 14 via inlet lines $I_a$ and $I_b$ to outlet manifolds 16 via outlet lines $O_a$ and $O_b$. In the depicted embodiment, pumps 12 are double-action reciprocating cylinder pumps driven by motorized actuators 18, with seals lubricated by lubricant system 20. Motorized actuators 18 can, for example, be linear DC step motors. Lubricant system 20 includes at least one lubricant reservoir and fluid routing lines suited to carry lubricant from lubricant system 20 to valve seals and other throat seals of pumps 12. Although lubricant system 20 is illustrated as a unitary system, some embodiments of spray system 10 can use separate A- and B-side lubricant systems, e.g with different lubricants.

Inlet and outlet manifolds 14 and 16, respectively, are valved manifolds that selectively couple pumps 12 to a plurality of fluid sources and outputs. Inlet and outlet manifolds 14 and 16 allow spray system 10 to switch between a plurality of connected fluids without any need to disconnect or reconnect fluid lines. Although each outlet manifold 16 is depicted with three outlets and each inlet manifold 14 is depicted with three inlets, any number of inlets and outlets can be used. Under ordinary operating conditions, valving in manifolds 14 and 16 allows only one input or output line to be open at a time. In some embodiments, inlet and outlet manifolds 14 and 16 are controlled electronically, as discussed in greater detail below with respect to controller 40. In other embodiments, inlet and outlet manifolds 14 and 16 can be actuated manually. Some embodiments of spray system 10 can allow for both electronic and manual valve actuation of inlet and outlet manifolds 14 and 16.

In the depicted embodiment, inlet manifolds 14 selectively connect pumps 12 to primary fluid sources 22 and 24 via fluid lines $F_1$ and $F_2$, respectively, and to solvent sources 26 via solvent lines S. Primary fluid sources 22*a* and 24*a* can, for example, be first and second paints P1 and P2, while primary fluid sources 22*b* and 24*b* can, for example, be first and second catalyst fluids C1 and C2. Solvent sources 26*a* and 26*b* can draw upon a common reservoir of solvent material, or can use different solvent materials.

In the depicted embodiment, outlet manifolds 16 similarly selectively connect pumps 12 to sprayers 28 and 30 via spray lines $S_1$ and $S_2$, and to waste fluid dump 31 via waste lines W. Waste fluid dump 31 accepts waste paint, catalyst, and solvent flushed from spray system 10 (e.g. when switching from first paint P1 and first catalyst fluid C1 to second paint P2 and second catalyst fluid C2). Sprayers 28 and 30 each accept spray lines from both A-side and B-side outlet manifolds 16. Sprayer 28, for example, accepts spray line $S_{1a}$ from A-side outlet manifold $16_a$ and spray line $S_{1b}$ from B-side outlet manifold $16_b$. Although only two sprayers 28 and 30 are depicted in FIG. 1, any number of separate sprayers can be used. Each sprayer can be dedicated to a single spray fluid combination (e.g. of paint and catalyst), to avoid mixture or fouling of different fluids. Accordingly, embodiments with additional fluid sources advantageously include additional sprayers, as well. Alternatively, sprayers need not be devoted to particular fluid combinations, but can be used sequentially for multiple different fluid combinations, if washed between spray sessions with different fluids. Sprayers 28 and 30 can, for example, be user-triggered spray guns or machine-actuated automatic sprayers.

In some embodiments, primary fluid sources 22 and 24 and solvent sources 26 are pre-pressurized sources capable of supplying at least 50% of output pressure of pumps 12. Pre-pressurized sources alleviate pumping load on motorized actuators 18, such that pumps 12 need only supply less than 50% (per the previously stated case) of output pressure. Sources 22, 24, and 26 can include dedicated pumps for pre-pressurizing fluids.

In the depicted embodiment, pumps 12 are metered linear pumps with dosing cylinders 32 that carry displacement rods 34. Displacement rods 34 are driven by motorized actuators 18, and both situate and drive plungers 36. In some embodiments, dosing cylinders 32, displacements rods 34, and plungers 36 may be balanced in working surface area so as to receive equal pressure from pre-pressurized sources (e.g. 22, 24) on up- and down-strokes.

The motor speed of motorized actuators 18 is variable, and determines the displacement of pumps 12. Displacement rods 34 extend into rod reservoirs 38, which can in some embodiments be flooded with lubricant from lubricant system 20. Pumps 12 each have inlet and outlet valves that actuate between up- and down-strokes of displacement rods 34 to direct fluid above or below plungers 36.

Spray system 10 is controlled by controller 40. Controller 40 is a computing device such as a microprocessor or collection of microprocessors with associated memory and local operator interface 42. Local operator interface 42 is a user interface device with, e.g. a screen, keys, dials, and/or gauges. In some embodiments of the present invention, local operator interface 42 can be a wired or wireless connection for a user operated tablet or computer. In other embodiments, local operator interface 42 can be an integrated interface configured to accept direct user input and provide diagnostic and operational data directly to a user. Local operator interface 42 can, for example, enable a user to input target ratios of A- and B-side fluid flow for each combination of A- and B-side fluids, and target output pressure. Local operator interface 42 can also provide users with diagnostic information including but not limited to failure identifications (e.g. for clogging or leakage), spray statistics (e.g. fluid volume sprayed or remaining), and status indications (e.g. "cleaning," "spraying," or "offline"). In some embodiments, controller 40 may include a database of known or previous configurations (e.g. target ratios and/or pressures for particular materials), such that a user at local operator interface 42 need only select a configuration from several options.

Controller 40 controls motorized actuators 18 via motor speed control signals $c_s$ and controls pump valving of pumps 12 via pump valve control signals $c_{PV}$. Controller 40 synchronizes valve actuation of pumps 12 with pump changeover to minimize downtime as plungers 36 reaches the top or bottom of their travel distances within dosing cylinder 32. In some embodiments, controller 40 may also control valving of inlet manifolds 14 and outlet manifolds 16 via inlet valve control signals $c_{IV}$ and outlet valve control signals $c_{OV}$, respectively. Controller 40 receives sensed pressure values $P_a$ and $P_b$ from pressure sensors 44a and 44b, respectively, and receives encoder feedback data $f_a$ and $f_b$ reflecting motor states from motorized actuators 18a and 18b, respectively.

Pumping system 10 provides substantially uniform and continuous spray pressure through pump changeovers at specified pressures and material ratios. Pumping system 10 enables clean and efficient pumping and fluid switching without risk of fluid contamination, and without need for lengthy downtimes or large volume use of washing solvents.

Figure 2A:
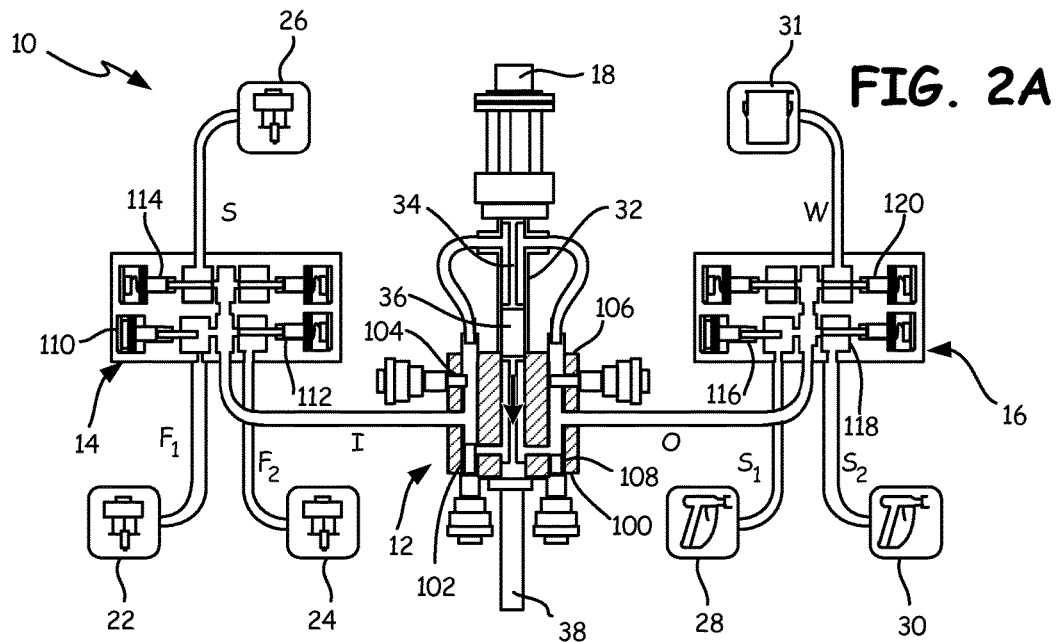
Figure 2B:
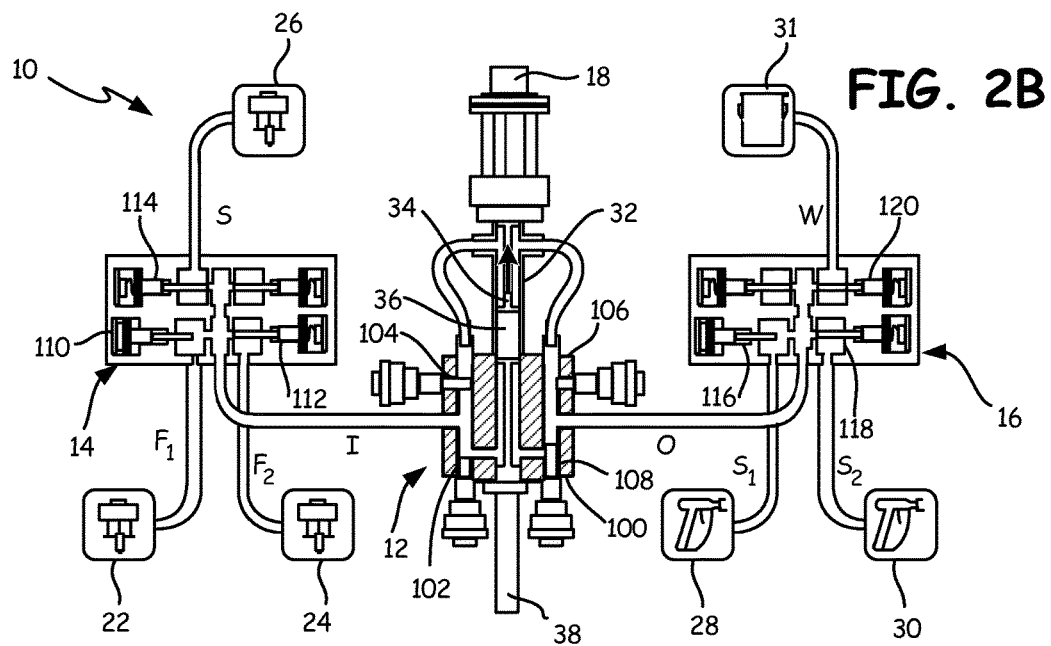

FIGS. 2a and 2b are schematic views of a spray system 10 focusing on pump 12 (i.e. 12a or 12b, equivalently). FIGS. 2a and 2b illustrate operating states of pump 12, with FIG. 2a depicting pump 12 in a down-stroke valve state and FIG. 2b depicting pump 12 in an up-stroke valve state. FIGS. 2a and 2b depict inlet manifold 14, outlet manifold 16, motorized actuator 18, primary fluid sources 22 and 24, solvent source 26, sprayers 28 and 30, waste fluid dump 31, dosing cylinder 32, displacement rod 34, plunger 34, and various connecting fluid lines as described previously with respect to FIG. 1. FIGS. 2a and 2b further depict body 100 of pump 12, "up" and "down" inlet valves 102 and 104, respectively, "up" and "down" outlet valves 106 and 108, respectively, inlet manifold valves 110, 112, and 114, and outlet manifold valves 116, 118, and 120.

FIGS. 2a and 2b depict a state of spray system 10 in which inlet manifold 14 has engaged primary fluid source 22 and outlet manifold 16 has engaged sprayer 28. Accordingly, inlet manifold valve 110 to fluid line $F_1$ is open, and inlet manifold valves 112 and 114 to fluid line $F_2$ and solvent line S, respectively, are closed. Similarly, outlet manifold valve 116 to sprayer 28 is open, while outlet manifold valves 118 and 120 to sprayer 30 and waste fluid dump 31, respectively, are closed. Valves 110, 112, 114, 116, 118, and 120 are depicted as pin valves, but any pressure-capable valves may equivalently be used. As noted with respect to FIG. 1, these valves may be actuated by controller 40, or directly by a user. Only one inlet manifold valve (110, 112, 114) and one outlet manifold valve (116, 118, 120) will ordinarily be open at any time.

Inlet valves 102 and 104 and outlet valves 106 and 108 of pump 12 are actuated by controller 40 in coordination with up- and down-strokes of displacement rod 34 and plunger 36. "Up" inlet and outlet valves 102 and 106, respectively, are open and "down" inlet and outlet valves 104 and 108, respectively, are closed while displacement rod 34 and plunger 36 travel upward (FIG. 2b). "Up" inlet and outlet valves 102 and 106, respectively, are closed and "down" inlet and outlet valves 104 and 108, respectively, are open while displacement rod 34 and plunger 36 travel downward (FIG. 2a). Controller 40 actuates these valves between pump strokes so as to minimize pump downtime during pump changeover. Lengthy changeover times can otherwise reduce output pressures and introduce undesirable pressure variation. The reciprocation of plunger 36 draws fluid from primary fluid source 22 into pump body 100 from inlet I, and forces fluid from pump body 100 towards sprayer 28 through outlet O. As mentioned above with respect to FIG.

1, pump 12 can be balanced to receive equal pressure assist from pre-pressurized fluid sources (i.e. 22, 24, 26). Balanced embodiments of pump 12 have displacement rods 34 and plungers 36 with equal up-stroke and down-stroke working surface area.

Figure 3:
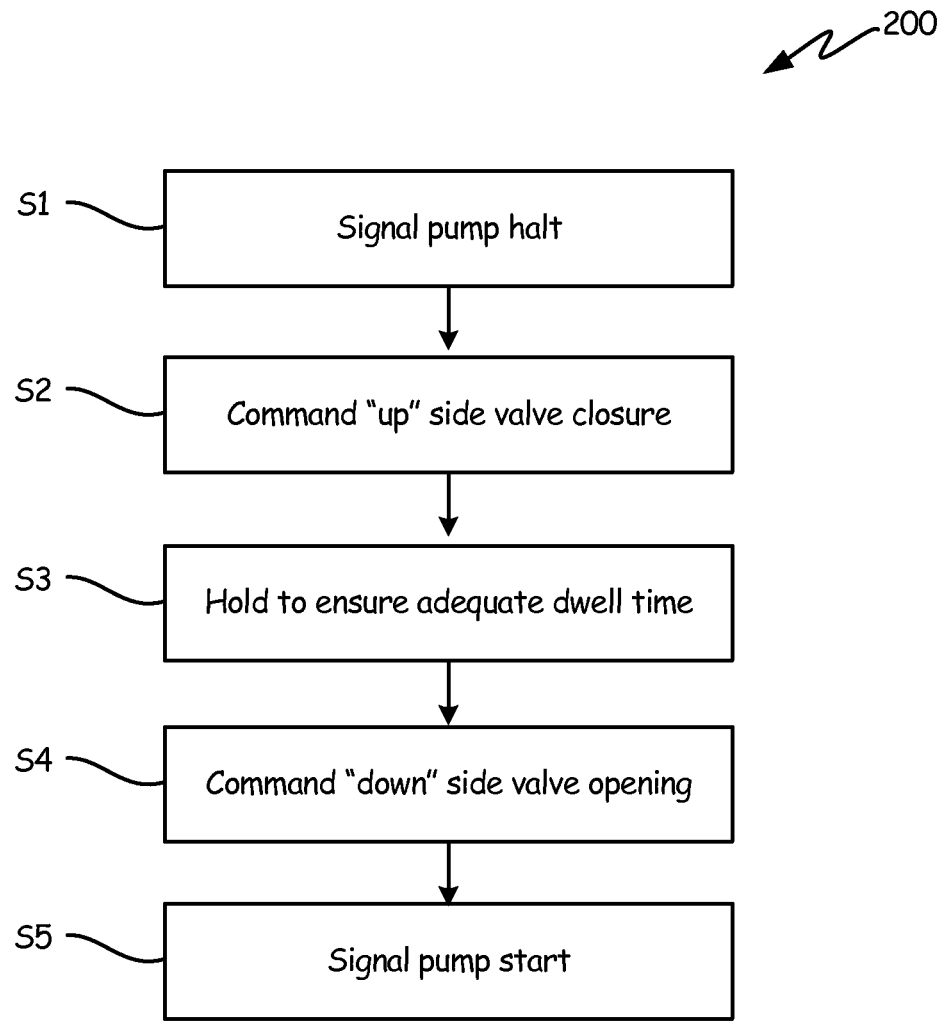
Figure 4:
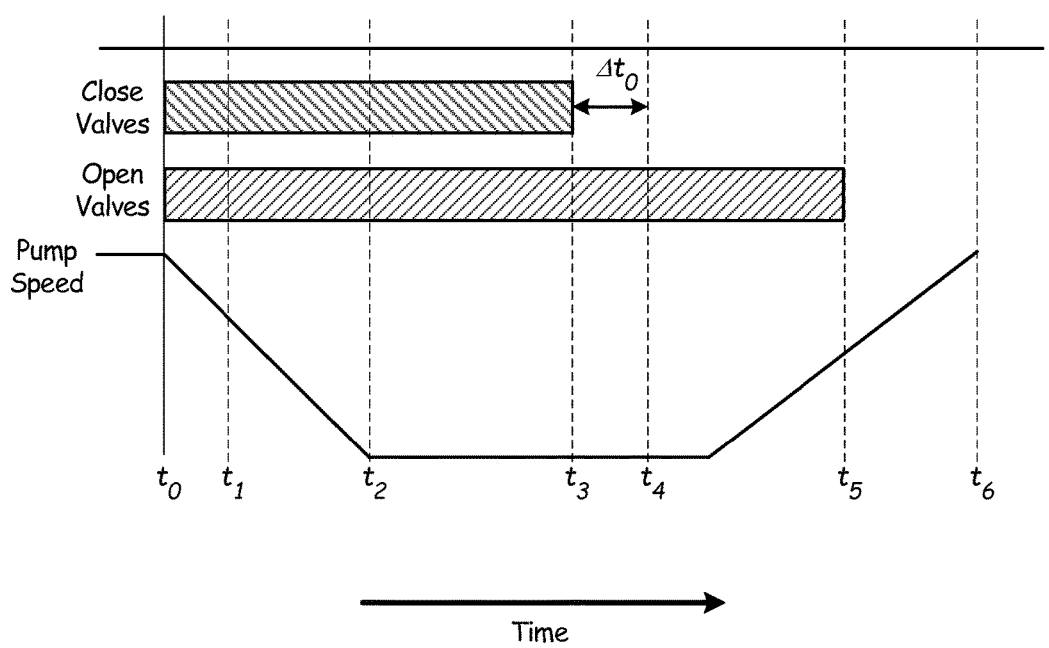

FIG. 3 is a method flowchart illustrating method 200. Method 200 is a control method illustrating a timing order to valve actuation at changeover of pump 12 from an up-stroke to a down-stroke. FIG. 4 is an illustrative graph of pump pressure and valve state as a function of time, according to the method 200. FIGS. 3 and 4 together illustrate a valve actuation process that reduces pump downtime at changeover, thereby reducing undesirable pressure fluctuation. Although method 200 and accompanying description hereinafter focus on an up-to-down changeover of pump 12, the general process is equally applicable to down-to-up pump changeovers.

At the start of pump changeover, at time $t_0$, controller 40 signals motorized actuator 18 to halt, stopping the reciprocation of pump 12. (Step S1). Motorized actuator 18 does not stop instantaneously, but rather slows to a halt at time $t_2$. At or near time $t_0$, controller 40 transmits an actuation signal commanding "up"-side valves 102 and 106 to close. (Step S2). Controller 40 waits to ensure an adequate dwell time such that "up" and "down" valves will not be open concurrently (Step S3), then transmits an actuation signal commanding "down"-side valves 104 and 108 to open (Step S4) at time $t_1$. In some embodiments, this second actuation signal is transmitted while pump 12 is in the process of slowing to a halt. Valves 102, 104, 106, and 108 do not close or open instantaneously. Rather, "up"-side valves 102 and 106 begin to mechanically close at a later time substantially corresponding with time $t_2$, at which pump 12 comes to a halt, and finish closing at later time $t_3$. Similarly, "down"-side valves 104 and 108 only begin to open at time $t_4$, after valves 102 and 106 have completely closed, and only finish opening at a later time $t_5$, which may be slightly after pump 12 has begun to reciprocate in the opposite direction. In no event, however, does pump 12 restart before time $t_4$, and $t_4$ is in all cases at least a dwell time $\Delta t_D$ later than time $t_3$, such that valves 102, 104, 106, and 108 are never open simultaneously. Depending on the delay between signal transmission and mechanical actuation of valves 102, 104, 106, and 108, for some embodiments $t_0$ may be very close to $t_1$. Generally, the transmission of actuation signals to valves 102, 104, 106, and 108 is timed so as to minimize overall changeover duration while ensuring an adequate dwell time to avoid flow-related or other mechanical problems. In some embodiments valve actuation signals may be transmitted only shortly after, or even slightly before, motorized actuators 18 are commanded to stop, depending on latency times for valves 102, 104, 106, and 108.

Dwell time $\Delta t_D$ is a minimum time period required by operational tolerances to ensure that valves 102 and 106 are fully closed before valves 104 and 108 begin to open. In some embodiment dwell time $\Delta t_D$ can for example be less than 10 milliseconds, and the total pump changeover time can for example be less than 60 milliseconds. Once "down"-side valves 104 and 108 have begun to mechanically open, controller 40 signals motor 12 to restart, driving plunger 36 in the opposite direction.

Method 200 and spray system 10 minimize pump downtime during changeover between up- and down-strokes of pump 12 by timing valve actuation signals to overlap latency periods of "up" and "down"-side valves. The resulting reduced changeover time increases average output pressure and improves spray pressure consistency.

Discussion of Possible Embodiments

The following are non-exclusive descriptions of possible embodiments of the present invention.

A spray system comprises: a fluid source for a spray fluid; a sprayer disposed to spray the spray fluid; a pump comprising: a metered double-action pumping cylinder with a reciprocating plunger; first and second inlet valves; and first and second outlet valves; and a controller configured to transmit a first signal causing the first inlet and outlet valves to close for pump changeover, and further configured to transmit a second signal while the first inlet and outlet valves are closing, the second signal causing the second inlet and outlet valves to begin opening.

The spray system of the preceding paragraph can optionally include, additionally and/or alternatively, any one or more of the following features, configurations and/or additional components:

A further embodiment of the foregoing spray system, wherein the controller is configured to: signal opening of the second inlet and outlet valves; signal the reciprocating plunger to stop for a changeover period; while the pump is stopping, signal the first inlet and outlet valves to close; while the first inlet and outlet valves are closing, signal the second inlet and outlet valves to open, such that the second inlet and outlet valves begin to mechanically open at least a dwell period after the first inlet and outlet valves have entirely closed; and command the reciprocating plunger to begin moving while the second inlet and outlet valves are closing.

A further embodiment of the foregoing spray system, wherein the dwell period is a minimum time period required by operational tolerances to ensure that the first inlet and outlet valves are fully closed before the second inlet and outlet valves begin to open.

A further embodiment of the foregoing spray system, wherein the first inlet and outlet valves are open and the second inlet and outlet valves are closed during an "up"-stroke of the pump, and wherein the second inlet and outlet valves are open and the first inlet and outlet valves are closed during an "down"-stroke of the pump.

A further embodiment of the foregoing spray system, wherein the sprayer also receives a second pressurized fluid from a second fluid source, and wherein the sprayer combines and sprays the combination of the spray fluid and the second pressurized fluid.

A further embodiment of the foregoing spray system, wherein the fluid source is pre-pressurized.

A further embodiment of the foregoing spray system, wherein the fluid source is pre-pressurized to at least 50% of a target pressure, such that less than 50% of a pressure of the spray fluid at the sprayer is provided by the pump.

A further embodiment of the foregoing spray system, wherein the controller signals the second inlet and outlet valves to open before the first inlet and outlet valves have finished closing, but the second inlet and outlet valves do not begin to mechanically open until after the first inlet and outlet valves have finished closing.

A further embodiment of the foregoing spray system, wherein the pump changeover lasts less than 60 millseconds.

A further embodiment of the foregoing spray system, wherein less than 10 milliseconds elapse during changeover between complete closure of the first inlet and outlet valves, and the second inlet and outlet valves beginning to open.

A method of actuating a double-action pump assembly with a reciprocating plunger, the method comprising: signaling the reciprocating plunger to stop for a changeover period; while the pump is stopping, signaling the first inlet and outlet valves to close; while the first inlet and outlet valves are closing, signaling the second inlet and outlet valves to open, such that the second inlet and outlet valves begin to mechanically open at least a dwell period after the first inlet and outlet valves have entirely closed; and signaling the reciprocating plunger to begin moving while the second inlet and outlet valves are closing.

The method of the preceding paragraph can optionally include, additionally and/or alternatively, any one or more of the following features, configurations and/or additional components:

A further embodiment of the foregoing method, wherein the pump stops completely substantially as the first inlet and outlet valves begin to mechanically close.

A further embodiment of the foregoing method, wherein the dwell period is a minimum time period required by operational tolerances to ensure that the first inlet and outlet valves are fully closed before the second inlet and outlet valves begin to open.

A further embodiment of the foregoing method, wherein the mechanical closure of the first inlet and outlet valves substantially corresponds with the complete halting of the pump.

A further embodiment of the foregoing method, wherein less than 60 milliseconds elapse between signaling the reciprocating plunger to stop for a changeover period and the second inlet and outlet valves beginning to mechanically open.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A spray system comprises:
a first fluid source for a first spray fluid;
a sprayer disposed to spray the first spray fluid;
a pump comprising:
  a metered double-action pumping cylinder with a reciprocating plunger;
  first and second inlet valves on a first side of the pump; and
  first and second outlet valves on a second side of the pump;
an inlet manifold selectively coupled to the first side of the pump and to the first fluid source;
an outlet manifold selectively coupled to the second side of the pump and to the sprayer; and
a controller configured to transmit a first signal causing the first inlet and outlet valves to close for pump changeover, and further configured to transmit a second signal while the first inlet and outlet valves are closing, the second signal causing the second inlet and outlet valves to begin opening;
wherein the first fluid source is pre-pressurized, wherein the first fluid source is pre-pressurized to at least 50% of a target pressure, such that less than 50% of a pressure of the first spray fluid at the sprayer is provided by the pump;
wherein the pump changeover lasts less than 60 milliseconds, wherein less than 10 milliseconds elapse during changeover between complete closure of the first inlet and outlet valves, and the second inlet and outlet valves beginning to open.

2. The spray system of claim 1, wherein the first inlet and outlet valves are open and the second inlet and outlet valves are closed during an "up"-stroke of the pump, and wherein the second inlet and outlet valves are open and the first inlet and outlet valves are closed during a "down"-stroke of the pump.

3. The spray system of claim 1, wherein the sprayer also receives a second spray fluid from a second fluid source, and wherein the sprayer combines and sprays the combination of the first spray fluid and the second spray fluid.

4. The spray system of claim 1, wherein the controller signals the second inlet and outlet valves to open before the first inlet and outlet valves have finished closing, but the second inlet and outlet valves do not begin to mechanically open until after the first inlet and outlet valves have finished closing.

* * * * *